United States Patent
Greither et al.

(10) Patent No.: US 8,023,236 B2
(45) Date of Patent: Sep. 20, 2011

(54) PRECISION GROUND FAULT DETECTION FOR AIRCRAFT HUMAN BODY PROTECTION

(75) Inventors: Markus Greither, Augsburg (DE); Gerd Michael Kluger, Ederheim (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 358 days.

(21) Appl. No.: 12/406,151

(22) Filed: Mar. 18, 2009

(65) Prior Publication Data

US 2010/0237713 A1  Sep. 23, 2010

(51) Int. Cl.
*H02H 3/16* (2006.01)

(52) U.S. Cl. .............................. 361/42; 361/44

(58) Field of Classification Search ............... 361/42–50
See application file for complete search history.

(56) References Cited

U.S. PATENT DOCUMENTS

| | | | |
|---|---|---|---|
| 4,879,624 A | 11/1989 | Jones | |
| 5,233,496 A | 8/1993 | Morishige | |
| 5,241,443 A | 8/1993 | Efantis | |
| 5,361,183 A | 11/1994 | Wiese | |
| 5,363,269 A | 11/1994 | McDonald | |
| 5,422,778 A | 6/1995 | Good | |
| 5,835,322 A | 11/1998 | Smith | |
| 6,040,967 A | 3/2000 | DiSalvo | |
| 6,583,975 B2 | 6/2003 | Bax | |
| 6,768,350 B1 | 7/2004 | Dickey | |
| 7,064,448 B2 | 6/2006 | Maier | |
| 7,292,011 B2 * | 11/2007 | Beneditz | 322/39 |
| 7,304,828 B1 | 12/2007 | Shvartsman | |
| 7,656,634 B2 * | 2/2010 | Robertson et al. | 361/93.7 |
| 2008/0129307 A1 | 6/2008 | Yu et al. | |

FOREIGN PATENT DOCUMENTS

| | | |
|---|---|---|
| AU | 2003229345 B2 | 12/2003 |
| WO | 03100938 | 12/2003 |
| WO | 2004040733 | 5/2004 |
| WO | 2005122355 | 12/2005 |

OTHER PUBLICATIONS

European Search Report dated Jan. 7, 2011.

* cited by examiner

*Primary Examiner* — Danny Nguyen
(74) *Attorney, Agent, or Firm* — Carlson, Gaskey & Olds, PC

(57) ABSTRACT

A power supply system for use with a component comprises at least three phases of power supply, with each of said three phases passing through a solid state power controller having an on/off switch. Each of the phases of power pass through a current sense transformer. A ground fault circuit receives an outlet from the current sense transformer. The ground fault circuit includes an analog filter connected into a digital processor. An output of the digital processor is operable to control the switches on the solid state power controllers. The three phases distribute power to the component when the switch on their associated solid state power converter is on.

15 Claims, 2 Drawing Sheets

PRECISION GROUND FAULT DETECTION FOR AIRCRAFT HUMAN BODY PROTECTION

BACKGROUND OF THE INVENTION

This application relates to a ground fault interrupt that is subject to fewer nuisance trips than existing circuits.

Ground fault interrupt circuits are provided to stop the flow of current if an undesirable condition is sensed. They are typically utilized in applications where there is a likelihood that a human can be injured if the undesirable current condition is allowed to occur. When utilized in most common electrical applications, the provision is relatively straightforward. There are challenges to providing ground fault interrupt above 1 kHz, as with such frequencies, there is a significant current that is not returned to a neutral wire through a ground fault isolator, but instead returns to ground structures. These frequencies need to be excluded from the ground fault measurement, as they might otherwise cause unnecessary shutdowns. On most ground-based systems, the fundamental frequency of AC power is fairly low, and on the order of 50 or 60 Hz. Thus, it is easy to implement a filter that has no significant attenuation for the fundamental frequency (50 or 60 Hz) but good attenuation for harmonics that are greater than 1 kHz.

However, on aircraft, AC power sources run typically at 400 Hz, with a maximum range up to 800 Hz and even higher. Therefore, implementing a filter with no attenuation at the fundamental frequency, 800 Hz for example, and sufficient attenuation at frequencies above 1 kHz is much more challenging.

This becomes particularly difficult when the system that is provided with the ground fault interrupt is one that might have human contact. As an example, the power supply for an entertainment system in an aircraft passenger seat raises challenges. The necessary low ground fault threshold (which may be as low as 20 mA) adds to the problem. Harmonics from such loads (e.g. switch mode power supplies) can be higher than the ground fault detection threshold.

Present ground fault protectors do not provide enough sensitivity to distinguish between fundamental and harmonic frequency content, and therefore result in nuisance trips, especially when configured for the low current level thresholds associated with systems to which humans may be exposed. Nuisance trips will often require that an operator manually reset a breaker or other switch. This can be time consuming and potentially dangerous if an actual ground fault condition does exist. Thus, reducing the number of nuisance trips would be beneficial.

SUMMARY OF THE INVENTION

A power supply system for use with a component comprises at least three phases of power supply, with each of said three phases passing through a solid state power controller having an on/off switch. Each of the phases of power pass through a current sense transformer. A ground fault circuit receives an outlet from the current sense transformer. The ground fault circuit includes an analog filter connected into a digital processor. An output of the digital processor is operable to control the switches on the solid state power controllers. The three phases distribute power to the component when the switch on their associated solid state power controller is on.

These and other features of the present invention can be best understood from the following specification and drawings, the following of which is a brief description.

DETAILED DESCRIPTION OF THE PREFERRED EMBODIMENT

Figure 1:
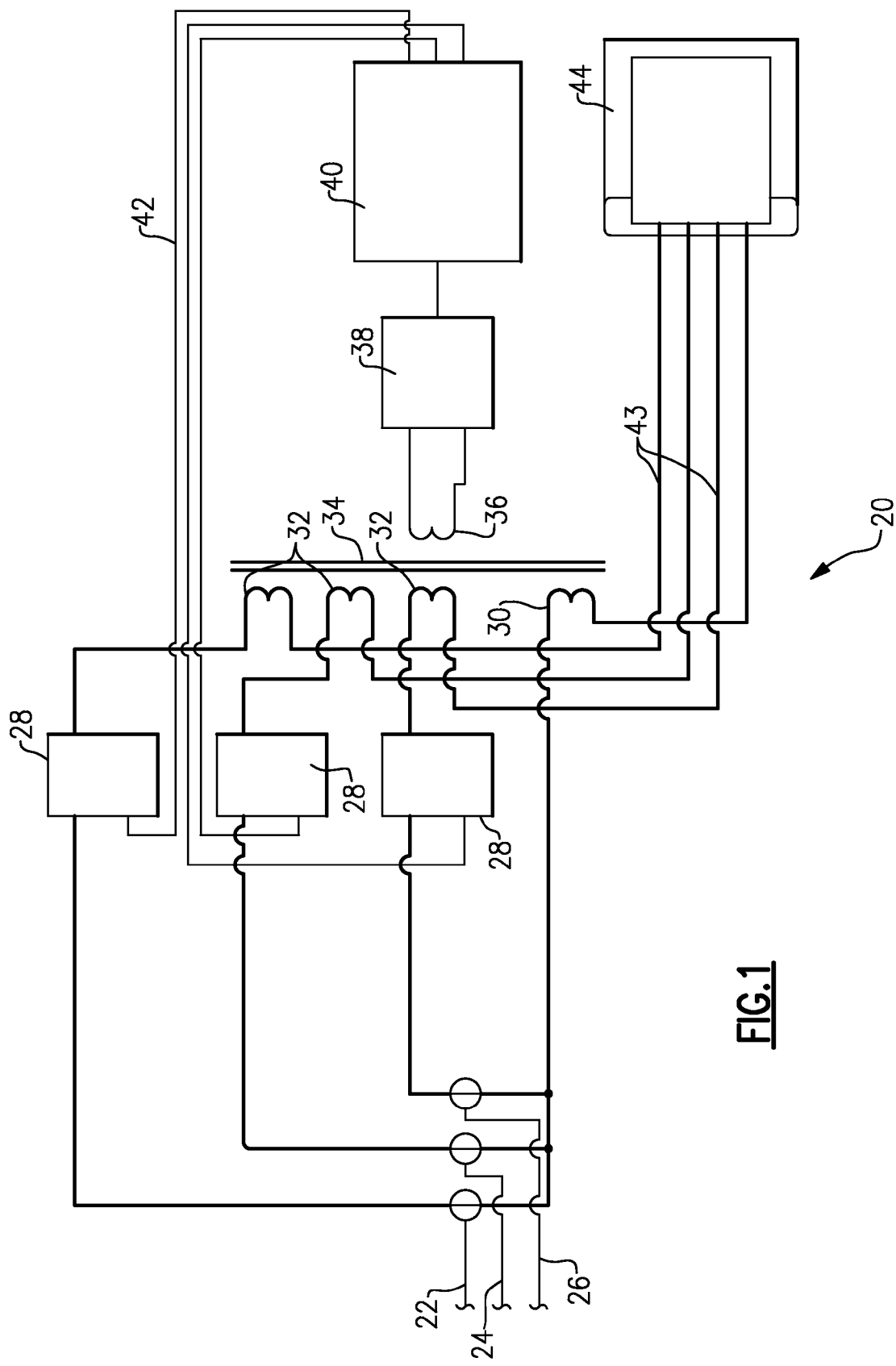
FIG. 1 is a schematic overview of an aircraft passenger seat electrical system.

FIG. 1 shows an overall system 20 including a power supply 22, 24, 26 supplying three phases of current to an aircraft passenger seat 44, and in particular for powering the entertainment equipment. While this is the particular disclosed application, other aircraft applications may benefit from this invention.

The three phases of power all pass through a solid state power controller (SSPC) 28, and then through coils 32 associated with a current sense transformer 34. A neutral line has coil 30 also associated with the current sense transformer 34. The current sense transformer has its own coil 36 which supplies a feedback signal from the coils 30 and 32 to an analog harmonic filter 38, and then to a digital ground fault processor 40. Processor 40 has three outputs 42, which are operable to open the SSPCs 28 should a ground fault situation be detected associated with any one of the three phases. As long as the SSPCs 28 are closed or "on," current will be supplied to lines 43, and then to the aircraft passenger seat 44.

Figure 2:
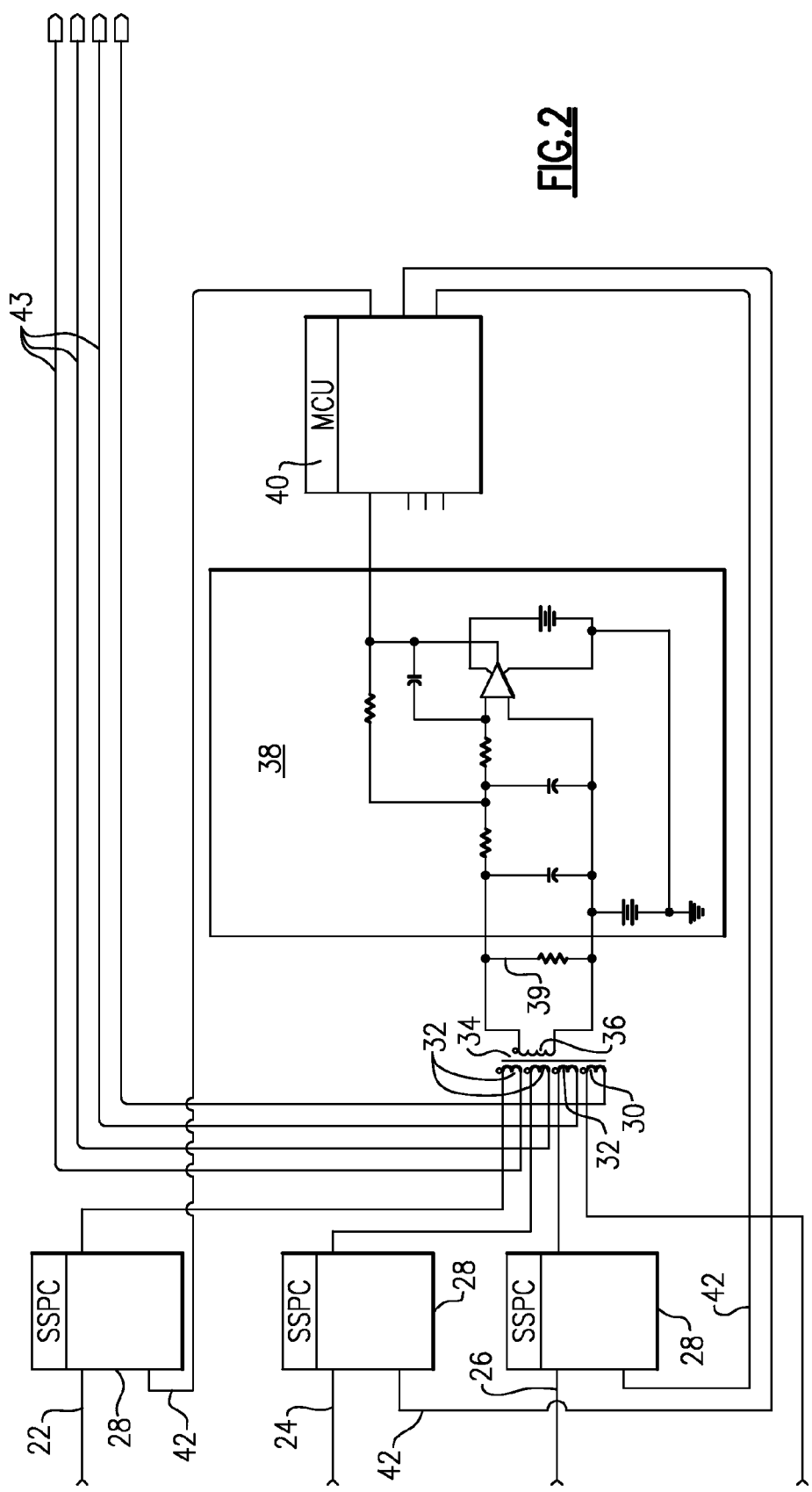
FIG. 2 is a schematic of the ground fault interrupt according to this application.

FIG. 2 shows details of the ground fault protection portion of system 20.

As can be seen, resistor 39 translates the current sense transformer output into a voltage at analog harmonic filter 38. Filter 38 is disclosed as a type of Butterworth analog filter. A Butterworth filter is preferred due to its flat frequency response in the pass band, however, other analog filters may be used. This filter reduces the signal noise (harmonics) without significant fundamental frequency attenuation, and also adjusts the signal amplitude to the input range of the analog to digital converter in the processor 40.

Further digital filtering occurs in the processor 40, including digital Infinite Impulse Response (IIR) or Finite Impulse Response (FIR). Finite response filtering settles to zero in a finite number of sample intervals. An infinite response filter may have internal feedback and may continue to respond indefinitely, which provides much stronger noise (harmonics) rejection than an analog filter alone at negligible fundamental frequency attenuation. This filtering can include a cut-off frequency only slightly above the range for the fundamental frequency, and high noise suppression but a flat response in the fundamental frequency range. This filtering occurs in software, and the harmonic content can be reduced to a level that does not cause false trips. The disclosed filter is particularly well suited when the fundamental frequency range is at least 800 Hz. If the root mean square of the imbalance current after the filtering in the processor 40 still exceeds a pre-set ground fault interrupter threshold, then the signal will be sent on lines 42 to open the associated SSPC.

A preset ground fault interrupt current threshold and trip time is incorporated into the software in the processor 40. When a time and threshold criteria is exceeded, then the processor 40 opens the SSPC 28 (or moves it to an "off" position) associated with the particular phase having the potential ground fault interrupt occurrence, or all phases dependent on the application needs.

While the invention is specifically disclosed for a passenger entertainment system, other applications that have a human interface may also benefit from these teachings. As an example, cockpit or galley controls may incorporate this ground fault detection circuitry. Further, other critical protection functions such as cabling installed in an aircraft fuel tank, or other applications can also benefit. In addition, there may be applications outside of the aircraft environment with other components that require ground fault protection.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A power supply system comprising:
   at least three phases of power supply, with each of said three phases passing through a solid state power controller having an on/off switch; and
   each of said at least three phases of power passing through a current sense transformer, and a ground fault circuit receiving an output from said current sense transformer, said ground fault circuit including an analog filter, an output of said analog filter being connected to a digital processor, an output of said digital processor being operable to control said switches on said solid state power controllers, and each of said at least three phases for communicating power to a component when the switch on its associated solid state power controller is on.

2. The system as set forth in claim 1, wherein said analog filter reduces a signal amplitude to an analog to digital converter range before a signal is sent to said processor.

3. The system as set forth in claim 1, wherein said analog filter is a Butterworth analog filter.

4. The system as set forth in claim 1, wherein said component is an aircraft component.

5. The system as set forth in claim 4, wherein said component is a passenger seat.

6. The system as set forth in claim 5, wherein said component is a passenger entertainment system associated with the passenger seat.

7. The system as set forth in claim 1, wherein the digital processor provides filtering including a cut-off frequency only slightly above the range of the fundamental frequency.

8. The system as set forth in claim 7, wherein said filtering is applied in software.

9. The system as set forth in claim 8, wherein said filtering includes an infinite impulse response filter.

10. The system as set forth in claim 8, wherein said filtering includes a finite impulse response filter.

11. The system as set forth in claim 1, wherein a fundamental frequency of the power supply system is at least 800 Hz.

12. A power supply system for use on an aircraft comprising:
    at least three phases of power supply, with each of said three phases passing through a solid state power controller having an on/off switch;
    each of said at least three phases of power passing through a current sense transformer, and a ground fault circuit receiving an outlet from said current sense transformer, said ground fault circuit including an analog filter, an output of said analog filter being connected into a digital filter and fault processor, an output of said digital filter and fault processor being operable to control said switches on said solid state power controllers, and each of said at least three phases for communicating power to a component associated with an aircraft when the switch on their associated solid state power controller is on;
    said analog harmonics filter being a Butterworth analog filter, which reduces a signal amplitude to an analog to digital converter range before a signal is sent to said digital filter and fault processor; and
    wherein the digital filter and fault processor include a cut-off frequency above the range of a fundamental frequency, wherein the fundamental frequency is at least 800 Hz. and where filtering is applied in software.

13. The system as set forth in claim 12, wherein said component is a passenger entertainment system associated with the passenger seat.

14. The system as set forth in claim 12, wherein said filtering includes an infinite impulse response filter.

15. The system as set forth in claim 12, wherein said filtering includes a finite impulse response filter.

* * * * *